No. 801,711. PATENTED OCT. 10, 1905.
C. COLLINS.
PLOW.
APPLICATION FILED NOV. 30, 1904.

2 SHEETS—SHEET 1.

Witnesses

Charles Collins,
Inventor by C. A. Snow & Co.,
Attorneys

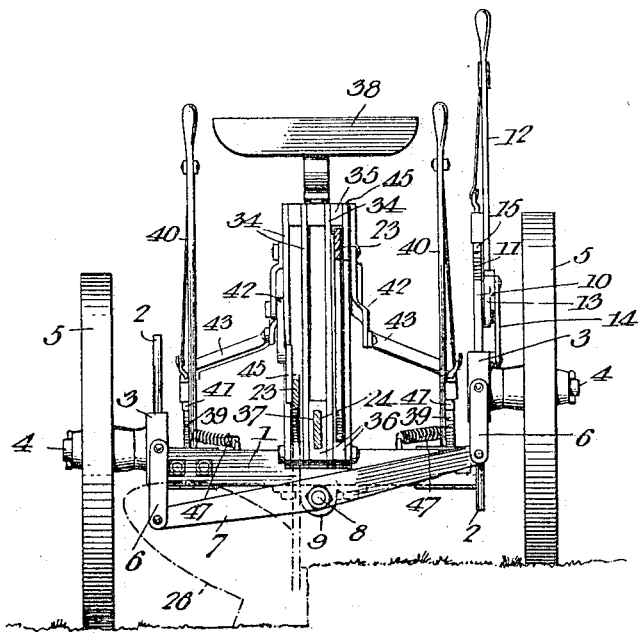

UNITED STATES PATENT OFFICE.

CHARLES COLLINS, OF ROCKYFORD, COLORADO.

PLOW.

No. 801,711.　　　　Specification of Letters Patent.　　　　Patented Oct. 10, 1905.

Application filed November 30, 1904. Serial No. 234,950.

*To all whom it may concern:*

Be it known that I, CHARLES COLLINS, a citizen of the United States, residing at Rockyford, in the county of Otero and State of Colorado, have invented a new and useful Plow, of which the following is a specification.

This invention relates to sulky-plows, and it has particular reference to that class of sulky-plows which are provided with right and left plow members in order that the plow may traverse the field and turn about at the end of the furrow, turning alternately a right and a left furrow, thus dispensing with the necessity of going around the field, thus avoiding what is known as "back" or "dead" furrows and leaving the land in level condition suitable for irrigation.

Among the objects of the invention are to improve and to simplify the construction of devices of the class referred to; to provide for the convenient adjustment of the transporting-wheels, whereby said wheels may be alternately raised and lowered, so that each wheel may be alternately used as a land-wheel and as a furrow-wheel; to provide improved mechanism for effecting the adjustment of the plows and for simultaneously effecting proper adjustment of an auxiliary supporting-wheel at the rear part of the frame of the machine, said wheel being adapted to travel in the furrow behind the earth-engaging plow, and to provide a construction which shall admit of both plow members being simultaneously placed in operative position, as for the purpose of opening ditches for irrigation and the like.

With these and other ends in view, which will readily appear as the nature of the invention is better understood, the same consists in the improved construction and novel arrangement and combination of parts which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
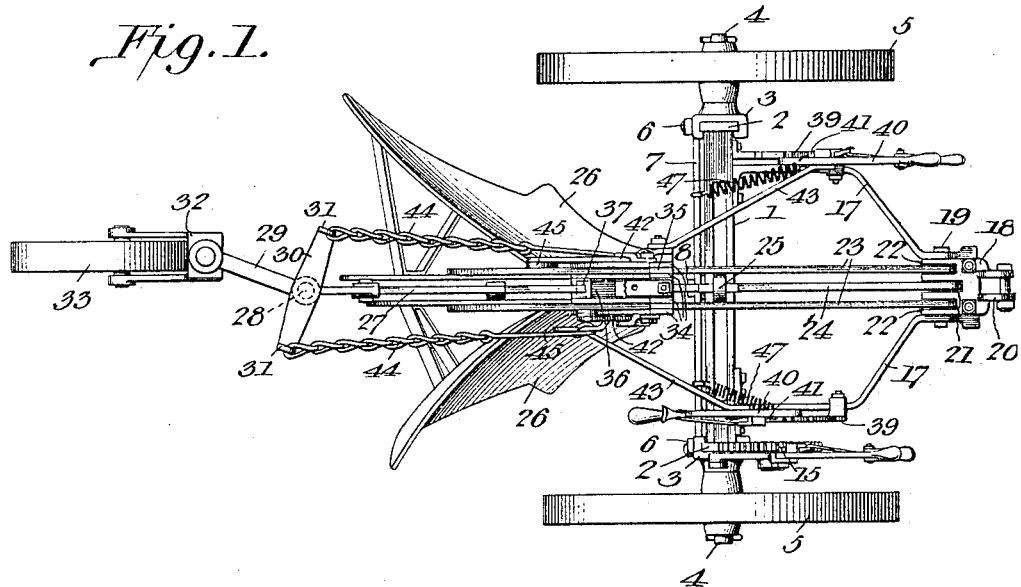
Figure 2:
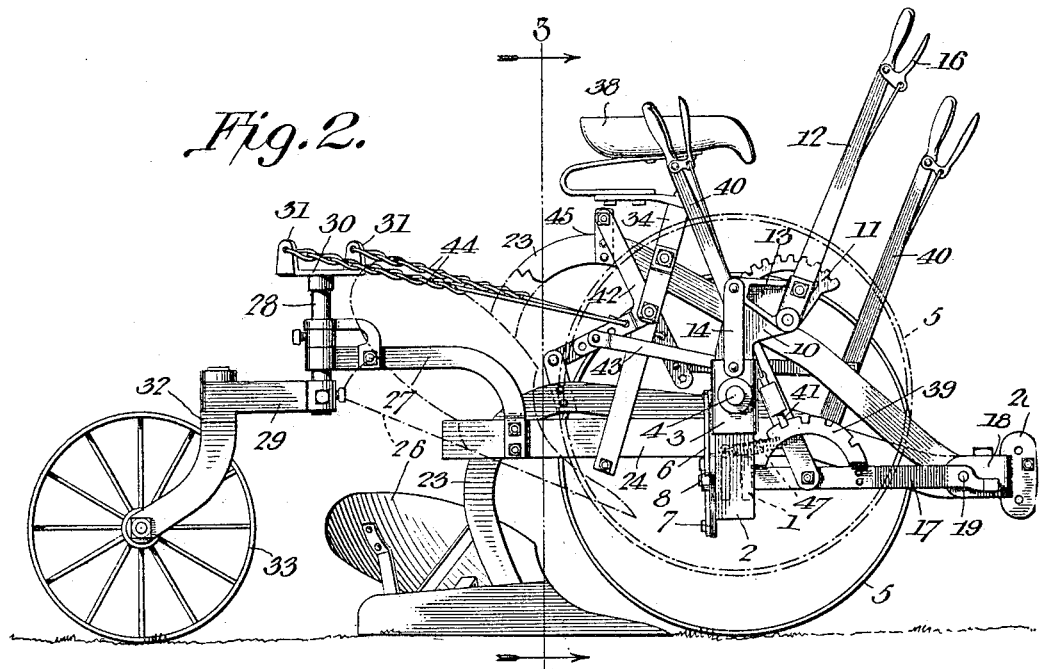

In said drawings, Figure 1 is a top plan view of a sulky-plow constructed in accordance with the principles of the invention, the seat having been removed for the purpose of exposing the subjacent construction. Fig. 2 is a side elevation with the near wheel and the near plow member shown in dotted lines. Fig. 3 is a transverse sectional view taken on the line 3 3 in Fig. 2.

Corresponding parts in the several figures are indicated by like characters of reference.

The frame of the improved plow is composed mainly of a transverse beam 1, constituting an axle and provided at the ends thereof with uprights 2 2, said uprights or vertical members being in the nature of guides and supports for the boxes 3 3, which are mounted to slide vertically thereon and which carry the spindles 4, upon which the transporting-wheels 5 are journaled. The boxes 3 are connected by means of links 6 with a rocking bar 7, which is mounted pivotally upon a fulcrum-pin 8, which is supported in a boxing 9, suitably connected with and supported by the axle 1. One of the uprights or vertical members 2, preferably the one at the right-hand side of the machine, is provided at its upper end with a forwardly-extending bracket 10, upon which is formed a rack-segment 11. Pivotally connected with the bracket 10 and concentric with the rack-segment 11 is a hand-lever 12, having an arm or crank 13, which is pivotally connected with one end of a link 14, the opposite end of which is pivotally connected with one of the boxes 3.

It will be observed that by manipulating the lever 12 the box 3, with which it is connected, will be moved upwardly or downwardly upon the upright 2, thus transmitting through the link 6 a rocking movement to the bar 7, whereby the movement is transmitted to the wheel carrying box 3 at the opposite side of the machine, thus causing the transporting-wheels to be raised or lowered with relation to the frame, it being understood, of course, that when one wheel is raised the other wheel will be lowered. The hand-lever 12 is provided with a spring-actuated catch 15 of ordinary construction, said catch being operated by means of a handle 16, suitably connected with the lever 12. The latter may thus be retained at any desired adjustment, thus retaining the transporting-wheels securely in any position to which they may have been adjusted. It is thus obvious that either one of the wheels may be raised so as to constitute a land-wheel, while the other wheel is lowered so as to constitute a furrow-wheel. It is further evident that the adjustment of the wheels may be regulated and varied according to the depth of the furrow. It will also be seen that the two wheels may be adjusted to and supported at the same level, as for the purpose of transporting the machine from one place to another.

The axle member or main frame-beam 1 has been illustrated in the drawings as consisting of a vertically-slotted beam or casting, although this is not to be considered as an essential feature of the construction, inasmuch as a solid beam might well be used. Suitably connected with said axle or main beam are side pieces 17, the front ends of which are made to converge, the front extremities of said side members being spaced apart by means of a block 18, which is secured between said side members by a transverse bolt 19 or other suitable means. The block 18 is provided with forwardly-extending lugs 20, which serve in the usual manner for the attachment of the draft. The said block 18 is provided in the rear side thereof with a central slot or recess 21 and additional recesses 22 at either side of the central recess. Upon the bolt 19, which extends through the several recesses, are pivotally mounted the plow-beams 23, the forward ends of which are fitted in the recesses 22. Fitted in the central recess 21 and engaging the bolt 19 is a longitudinal frame-bar 24, which extends rearwardly above the axle upon which it is supported and with which said frame member is connected by means of a clip 25 of suitable construction. The plow-beams 23 carry the plow members 26, one of which is of right-hand and the other of a left-hand pattern and which are mounted with their land-sides facing each other. The plow-beams and plow members may be of ordinary or of any well-known and approved construction.

The longitudinal frame member 24 has been shown as being provided with a rearwardly-extending bracket 27; but it is to be understood that this bracket may be integral with the frame-beam and that it actually forms a part of said frame-beam. The said bracket or frame-beam is provided at the rear end thereof with bearings for a vertically-disposed shaft 28, provided at its lower end with an arm or crank 29 and at its upper end with a cross-bar 30, which latter is preferably disposed approximately at right angles to the crank 29. The cross-bar 30 is provided at the ends thereof with upturned lugs 31. At or near the outer end of the crank 29 is swiveled a shank 32, carrying a caster-wheel 33.

It will be observed that by rocking the shaft 28 in its bearings the crank 29 may be thrown either to the right or to the left side of the center of the machine. The caster-wheel carried by and having swivel connection with said crank may be accordingly transferred from one side of the machine to the other, so as to travel in the furrow which is being turned by the earth-engaging plow member, or the said caster-wheel may be adjusted to travel centrally in the wake of the machine when the latter is being used for ditching purposes or is being transported from one place to another.

The frame of the machine includes upright members 34, which are four in number and which are spaced apart and connected with each other at their upper and lower ends by spacing members 35 36, which latter has been shown as being provided with a central aperture 37, whereby it is mounted upon the longitudinal frame-beam 24, with which the upright members 34 are thus connected. Said upright members serve to support the seat 38, and the plow-beams 23 are confined between and guided vertically by the outer and inner upright members 34.

Suitably connected with and supported by the frame of the machine, at either side thereof, are notched segments or rack-bars 39, concentrically with which are pivoted hand-levers 40, having spring-actuated catches 41 engaging the said notched segments or rack-bars. Pivotally connected with the outermost upright members 34 are bell-crank levers 42, one at each side of the machine. The lower arms of these bell-crank levers are connected by means of links 43 with the hand-levers 40, and said lower arms are also connected by means of links or chains 44 with the upstanding lugs 31 of the cross-bar 30 upon the shaft 28, carrying the arm 29, with which the wheel-carrying shank 32 is pivotally connected. The upper arms of the bell-crank levers 42 are provided with stirrups 45, supporting the plow-beams 23. The hand-levers 40 are connected with the frame of the machine by means of coiled springs 47, which when said levers are operated to set the plows into the ground are strained, so that when said levers are actuated to lift the plows from the ground they will assist in raising the weight of the plows. These springs are obviously especially useful when the connecting means between the bell-crank levers 42 and the cross-bar 30 are temporarily removed, as will be hereinafter set forth.

The operation and advantages of this invention will be readily understood from the foregoing description taken in connection with the drawings hereto annexed. The transporting-wheels are set by means of the adjusting-levers 12, according to the work that is to be performed, and the plows are likewise set or adjusted by means of the hand-levers 40, which latter, owing to the connection between the plows, which includes the links 43, the bell-crank levers 42, the links 44, and the cross-bar 30, must be operated simultaneously, as will be readily understood. This latter is an important consideration, inasmuch as owing to the connections just described the weight of the plows will be equally balanced, and consequently but slight force will need to be exerted in order to effect the desired adjustment. When the end of a furrow is reached, the plows are first adjusted to a common level. The machine is then turned in the direction of the land, which enables the turn to be made with comparatively slight strain upon the draft-team, and the wheels and the plows are then readjusted and placed in position for the return trip across the field. It will be observed that the caster-wheel 33 is adjusted with the plows and by the same mechanism. When the plows are placed at the same elevation, the caster-wheel will occupy a central position in rear of the frame. When either plow is lowered into operative position, the crank-arm 29 and the caster-wheel will swing around into alinement with the plow, which is lowered for the purpose of tracking in the furrow made by said plow.

When it shall be desired to use the machine for ditching purposes, the connecting means between the bell-crank levers 42 and the cross-bar 30 are temporarily removed. The plow-adjusting levers 40 may then be operated independently to set the plows at the desired level. When the machine is used in this manner the caster-wheel will of its own volition travel centrally in the wake of the machine.

Having thus described the invention, what is claimed is—

1. In a sulky-plow, an axle, guide members supported by said axle, wheel-carrying boxes movable upon said guide members, a rocking bar connected pivotally with the axle, and link connections between the ends of said rocking bar and the wheel-carrying boxes.

2. In a sulky-plow, an axle having upright guide members, wheel-carrying boxes movable upon said guide members, a rocking member pivotally supported by the axle, links connecting the ends of said rocking member with the movable wheel-carrying boxes, a right-hand and a left-hand plow, and means for effecting vertical adjustment of said plows.

3. In a sulky-plow, a wheel-supported frame including an axle and vertically-adjustable supporting-wheels, forwardly-converging side beams connected with the axle, a notched spacing-block mounted between the front ends of the side beams, a transverse bolt securing said block and extending through the notches therein, plow-carrying beams engaging the outer notches of the spacing-block and secured by the transverse bolt, a longitudinal frame-beam engaging the central notch of the spacing-block and secured by the transverse bolt, and means for connecting said longitudinal frame-beam with the axle.

4. In a sulky-plow, a wheel-supported frame including an axle and forwardly-converging side beams, a spacing-block between the front ends of the side beams, plow-carrying beams connected pivotally with the spacing-block, a longitudinal frame-beam connected with said spacing-block and supported upon the axle, and a caster-wheel-carrying member having swivel connection with the rear end of said longitudinal frame-bar.

5. In a sulky-plow, a wheel-supported frame, right and left hand plow-carrying beams supported adjustably in said frame, a centrally-disposed longitudinal frame-beam, a crank having pivotal connection with said longitudinal frame-beam, a wheel-carrying shank having swivel connection with the crank and means for simultaneously adjusting the plow-beams and the wheel-carrying crank.

6. In a sulky-plow, a frame, right and left hand plow-carrying beams supported in said frame, a crank, a trailer-wheel-carrying shank having swivel connection with said shank, adjusting means for the plow-carrying beams, and connecting means between said adjusting means and the wheel-carrying crank whereby the latter shall receive positive adjustment through the medium of the plow-adjusting means.

7. In a sulky-plow, a wheel-supported frame including an axle, forwardly-converging side beams, a longitudinal beam, and a plurality of spaced upright bars connected with the longitudinal beam, plow-carrying beams supported at the front end of the frame and guided vertically between the spaced upright bars, a rock-shaft supported at the rear end of the longitudinal frame-beam, a trailer-wheel-carrying shank having swivel connection with the crank extending from said rock-shaft, a cross-bar upon the latter, bell-crank levers pivoted upon the outermost uprights of the frame, link connections between said bell-cranks and the cross-bar upon the rock-shaft, adjusting-levers, link connections between said adjusting-levers and the bell-cranks, and plow-beam-supporting stirrups connected with said bell-cranks.

8. A sulky-plow including a frame, vertically-adjustable transporting-wheels, pivotally-supported right and left hand plow-carrying beams, a swinging arm or crank, a trailer-wheel-carrying shank having swivel connection with said crank, and means for effecting simultaneous and positive adjustment of said crank and of the plow-carrying beams.

9. In a sulky-plow, a wheel-supported frame, means for effecting simultaneous vertical adjustment in opposite directions of the wheels on the opposite sides of the frame, a pair of plow-carrying beams pivotally supported in said frame, adjusting-levers connected with said plow-beams, and springs connecting said adjusting-levers with the frame.

In testimony that I claim the foregoing as my own I have hereto affixed my signature in the presence of two witnesses.

CHARLES COLLINS.

Witnesses:
G. M. SHELTON,
J. B. COSNER.